Jan. 2, 1945. N. M. FOSTER 2,366,322
GAS MIXER
Filed July 21, 1941
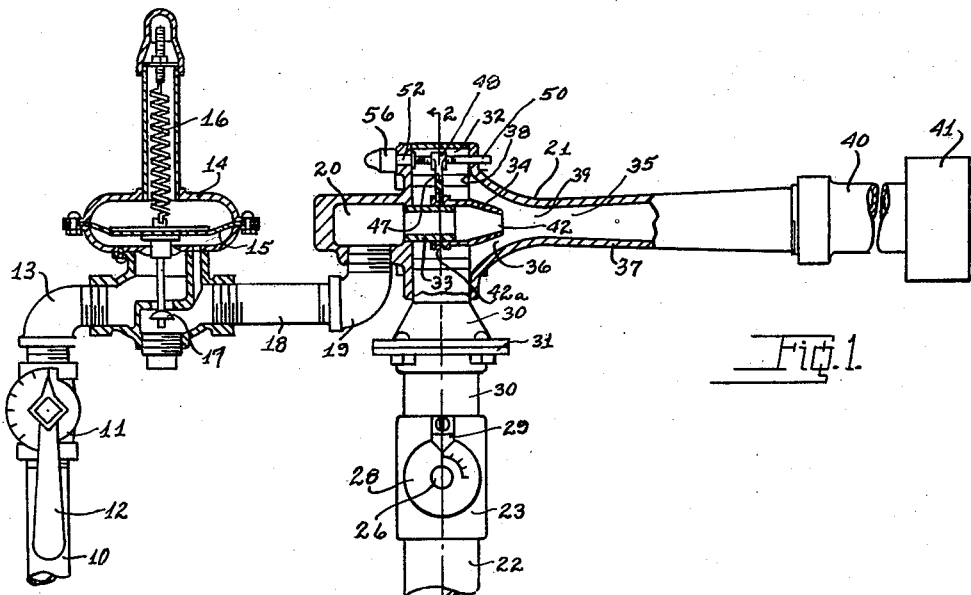
Fig. 1.
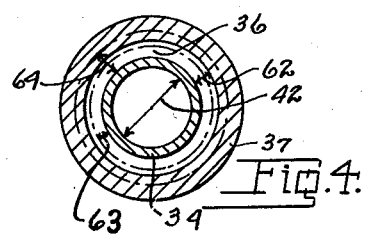
Fig. 2.
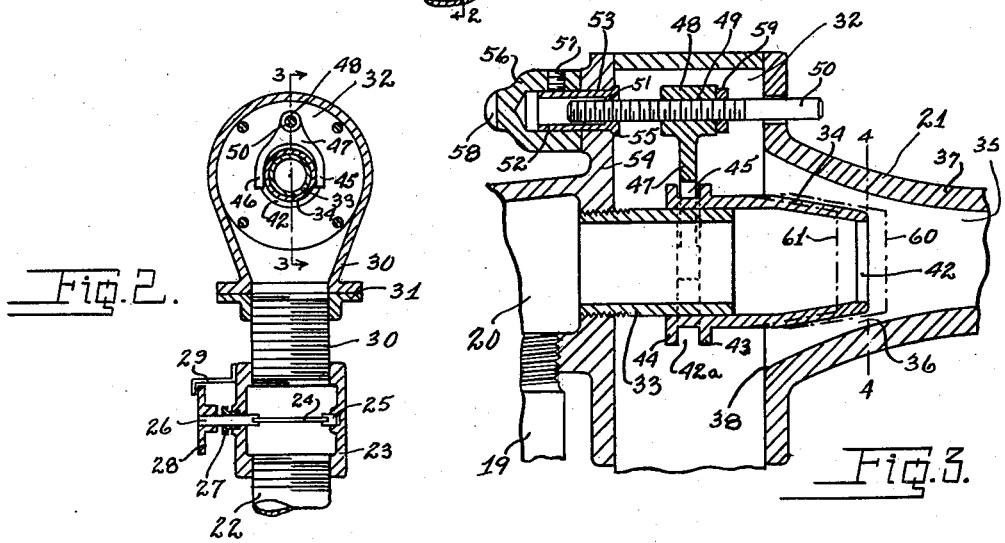
Fig. 3.
Fig. 4.
INVENTOR.
NORMAN M. FOSTER
BY
Joseph A. Pave
Attorney Patented Jan. 2, 1945

2,366,322

UNITED STATES PATENT OFFICE 2,366,322

GAS MIXER

Norman M. Foster, New Castle, Ind., assignor to Western Products, Incorporated, New Castle, Ind., a corporation of Indiana Application July 21, 1941, Serial No. 403,255

4 Claims. (Cl. 48—180)

This invention relates to improvements in a gas mixer, that is, a mechanism which mixes gas with air so that proper combustion may be obtained.

In order to have proper combustion the mixture, that is, the ratio of air to gas fuel, must be at the proper point. In the past gas mixers have been provided wherein, in order to obtain this proper ratio of air to gas, it was necessary to substitute or change one of the parts either the gas nozzle orifice or the air orifice. These mechanisms are not particularly desirable since after they are placed on the job considerable time is consumed in obtaining from the manufacture the replacement parts if, for some reason or other, the ratio as established by the manfacture is not suitable in the field.

It is, therefore, an object of this invention to provide a gas mixer wherein an adjustment can readily be made between the gas orifice and air orifice after the mixer is assembled and without the substitution of parts.

Another object of this invention is the provision of a gas mixer wherein the orifice of the mixing chamber may be readily changed by a simple adjustment of the nozzle.

A further object of this invention is the provision of means on a gas mixer, the operation of which will adjust the ratio of the air to the gas after the mixer has been mounted in position and should it be desired, for any reason, to change the type or kind of flame at the burner.

Other objects and advantages of the present invention should be readily apparent by reference to the following specification considered in conjunction with the accompanying drawing forming a part thereof, and it is to be understood that any modification may be made in the exact structural details there shown and described, within the scope of the appended claims, without departing from or exceeding the spirit of the invention.

In the drawing:

Fig. 1 is a view partly in section and partly in elevation showing a burner assembly including the improvements of this invention.

Fig. 2 is a transverse sectional view taken on line 2—2 on Fig. 1.

Fig. 3 is an enlarged fragmentary sectional view of a portion of Fig. 1 and illustrating in cross section certain parts shown in elevation in Fig. 1 and taken on line 3—3 on Fig. 2.

Fig. 4 is a sectional view taken on line 4—4 on Fig. 3.

Throughout the several views of the drawing similar reference characters are employed to denote the same or similar parts.

There is illustrated in Fig. 1 a burner assembly for burning natural, manufactured or mixed gas with the source of the gas and air not shown. As shown in Fig. 1 use is made of a pipe or conduit 10 for the gas which includes a shut off cock or valve 11 operated by a handle 12. The gas supply pipe 10 terminates through the elbow 13 in a pressure regulator 14. As usual gas under pressure of from 2 to 16 oz. is supplied by the pipe 10 to the gas pressure regulator or governor 14. This is known as low pressure gas. The gas pressure regulator has its diaphragm 15 regulated by the spring 16 to open and pass gas around its valve 17 at substantially zero or atmospheric pressure. Suffice it to say that the pressure regulator or governor 14 is adjustable to lower the pressure of the gas in the pipe 10 to zero or atmospheric pressure and supply same by way of the nipple 18 and elbow 19 to the chamber 20 of the gas mixer indicated in general by the reference character 21.

An air supply pipe 22 extending from an air source (not shown) which is under pressure of from 4 to 16 oz. supplies air to the mixer 21. In order to control the amount of air being supplied to the mixer the supply pipe 22 includes a valve 23 which may be of any suitable or desirable type and in the past has taken the form of a blast gate, a butterfly valve, a full opening cock or a gate valve. As shown in the drawing use is here made of a butterfly valve having a disc 24 diametrically connected at its opposite ends, respectively, with a stud 25 and a shaft 26. The shaft 26 passes through the valve housing at one point where it is provided with packed joint 27 and the shaft carries at its outer end, an actuating knob 28. The knob 28, see Fig. 1, may carry suitable indicia or markings cooperating with a pointer 29 to indicates the position of the valve disc 24 and therefore the amount of air being supplied to the mixer 21. The air, on passing through the valve 23, passes through suitable pipes 30 and coupling 31, where it enters the air chamber 32 of the mixer.

The gas upon leaving the gas chamber 20 passes through a pipe 33 and a nozzle 34 into the mixing chamber 35. The air passes around the outside of the pipe 33 and nozzle 34 to the mixing chamber 35 and so doing passes through an opening or orifice 36 formed between the outer surface of the nozzle 34 and inner surface of the mixer chamber tube 37.

This tube 37 is known as a Venturi tube since the passage therethrough gradually contracts from a relative large opening 38 to a constricted throat 39 whereupon it widens out in a relatively slow ascending cone.

The operation of the mechanism thus further described is as follows:

Air at a pressure, as mentioned above generally between 4 and 16 oz. is supplied through the pipe or conduit 22 at a rate depending upon the position of adjustment of the valve shutter 24. This air in passing through the orifice 36 to and through the Venturi throat 39 creates a suction in the nozzles 34 and pipe 33 for drawing gas from the chamber 20. Since the gas in the chamber 20 is at substantially zero or atmospheric pressure it has substantially no flow and must be drawn by the suction created in the flow of air past the nozzle 34 and through the orifice 36. The greater the flow of air the greater the amount of gas drawn from the chamber 28 and entrained with the air. The mixed air and gas passes from the mixer 21 into a burner 40 and is ignited at the nozzle 41.

The ratio of the air to the gas, or the amount of gas to the amount of air per cubic measure of mixed gas and air supplied to the burner 40, is determined by the ratio of the orifice 36 to the opening or orifice 42 of the nozzle 34, and the kind of flame or character of combustion at the burner nozzle 41, whether oxidizing, neutral or reducing, is determined by this ratio and the kind of gas consumed.

In the past in order to control or adjust the ratio of the gas nozzle orifice 42 to the air orifice 36 it has been customary to change the nozzle 34 to one which would have a smaller or a greater orifice 42. Another practice that has been resorted to is the supplying of a choke bar or rod which extended through the orifice 42 to thereby change the orifice area to that of the air orifice area. In each of these instances however it was necessary to supply a number of nozzles or a number of choke bars and frequently necessary to await the arrival of these replacement parts from the manufacture. This is frequently necessary after the insulation had been completed.

By the present invention the ratio of the gas nozzle orifice 42 to the air orifice 36 can be made without any replacement and is effected as follows. The gas nozzle 34 has a sliding fit on the gas pipe 33 and is provided at its rear end with a grove 42a flanked on each side by a collar 43 and 44. Disposed within the grove 42 are the arms 45 and 46 of a yoke or fork 47 whose upper end is provided with a boss 48 having a threaded aperture 49 extending therethrough. A threaded bar 50 is threaded through the boss 48 as well as threaded through an aperture 51 formed in one end of a bushing nut 52. The bushing nut 52 is mounted for rotation in a plane aperture 53 in one wall 54 of the mixer 21. The bushing nut 52 has on its inner end a collar 55 which seats in a counterbored seat in the wall 54 to limit the movement of the bushing nut relative to its aperture 53 in one direction. The bushing nut 52 projects outwardly of the wall 54 to receive an actuating member 56 which is secured to the bushing 52 by a dog or set screw 57. The outer end of the actuating member 56 may be transversely slotted, as at 58, for the reception of a screw driver or other tool to effect its operation. The fork or yoke 47 may be secured against independent movement on the bar 50 by a lock nut 59.

With the mechanism just described the nozzle 34 may be actuated axially of the pipe 33 for causing its forward end to approach or recede from the wall of the Venturi tube between the open inner end 38 and throat 39 to thereby restrict or enlarge the orifice 36. In Fig. 3 the nozzle is shown in three different positions the first in full lines, the second in dot and dash lines and indicated by the reference numeral 60 and third in dot and dash lines and indicated by the reference numeral 61. With the nozzle 34 in the solid line position of Fig. 3, the air orifice 36 is of a width indicated by the arrow 62, in Fig. 4, whereby a given quantity of air in passing through the said orifice 36 in a given length of time will entrain a certain amount of gas drawn through the gas nozzle orifice 42. With the gas nozzle 34 in the first dotted line position 60 its orifice is of the width indicated by the arrow 63 in Fig. 4 and the air passing therethrough in a given length of time and at the above given pressure will draw a different amount and a greater amount of gas through the nozzle orifice 42. Likewise with the gas nozzle 34 in its second dotted line position 61 the air orifice 36 has a greater width and is indicated by the arrow 64 and a greater amount of air will pass in a given length of time and draw proportionally less gas through the gas nozzle orifice 42.

From the foregoing it will therefore be evident that the ratio of air to gas can be very readily and expeditiously changed and without the necessity of manufacturing special parts, or the substitution of parts of different dimensions. With a mechanism such as disclosed in this application the character of combustion, that is the flame at the burner nozzle 41, may be changed from an oxidizing, neutral or reducing one to either of the others depending entirely upon the desires of the user.

What is claimed is:

1. In a gas mixer of the class described the combination of a housing having a chamber therein, a pipe extending through the chamber for the passage of gas, a nozzle on said pipe for movement longitudinally thereof, an air tube extending forwardly of the chamber and having a gradually constricting extrant into which the nozzle projects to form therearound an air orifice, and an axially movable member carried by the housing above the nozzle, means connecting the member with the nozzle and means for incrementally moving said movable member and thereby incrementally adjusting the nozzle on the pipe to vary the size of the orifice around the nozzle with respect to the size of the orifice through the nozzle.

2. In a gas mixer of the class described the combination of a housing having a chamber therein, a pipe extending through the chamber for the passage of gas, a nozzle on said pipe for movement longitudinally thereof, an air tube extending forwardly of the chamber and having a gradually constricting entrant into which the nozzle projects to form therearound an air orifice, and means for axially adjusting the nozzle on the pipe to vary the size of the orifice around the nozzle with respect to the size of the orifice through the nozzle, comprising a yoke engaging with the nozzle, and a threaded bar slidably supported by the housing for axial adjustment with the yoke.

3. In a gas mixer of the class described the combination of a housing having a chamber therein, a pipe extending through the chamber for the passage of gas, a nozzle on said pipe for movement longitudinally thereof, an air tube extending forwardly of the chamber and having a gradually constricting entrant into which the nozzle projects to form therearound an air orifice, and means for axially adjusting the nozzle on the pipe to vary the size of the orifice around the nozzle with respect to the size of the orifice through the nozzle, comprising a yoke engaging with the nozzle, a threaded bar slidably supported by the housing for axial adjustment with the yoke, and a knob exteriorly of the housing for effecting the axial adjustment of the yoke.

4. In a gas mixer of the class described the combination of a housing having a chamber therein, a pipe extending through the chamber for the passage of gas, a nozzle on said pipe for movement longitudinally thereof, an air tube extending forwardly of the chamber and having a gradually constricting entrant into which the nozzle projects to form therearound the air orifice and means for axially adjusting the nozzle on the pipe to vary the size of the orifice around the nozzle with respect to the size of the orifice through the nozzle, comprising a yoke engaging with the nozzle, a threaded bar slidably supported at one end by the housing and having secured thereto the yoke, a nut rotatably supported by the housing at the other end of the bar and said nut threadedly receiving the bar, and a knob exteriorly of the housing carried by the nut for rotating same and thereby effecting the axial adjustment of the yoke.

NORMAN M. FOSTER.